UNITED STATES PATENT OFFICE.

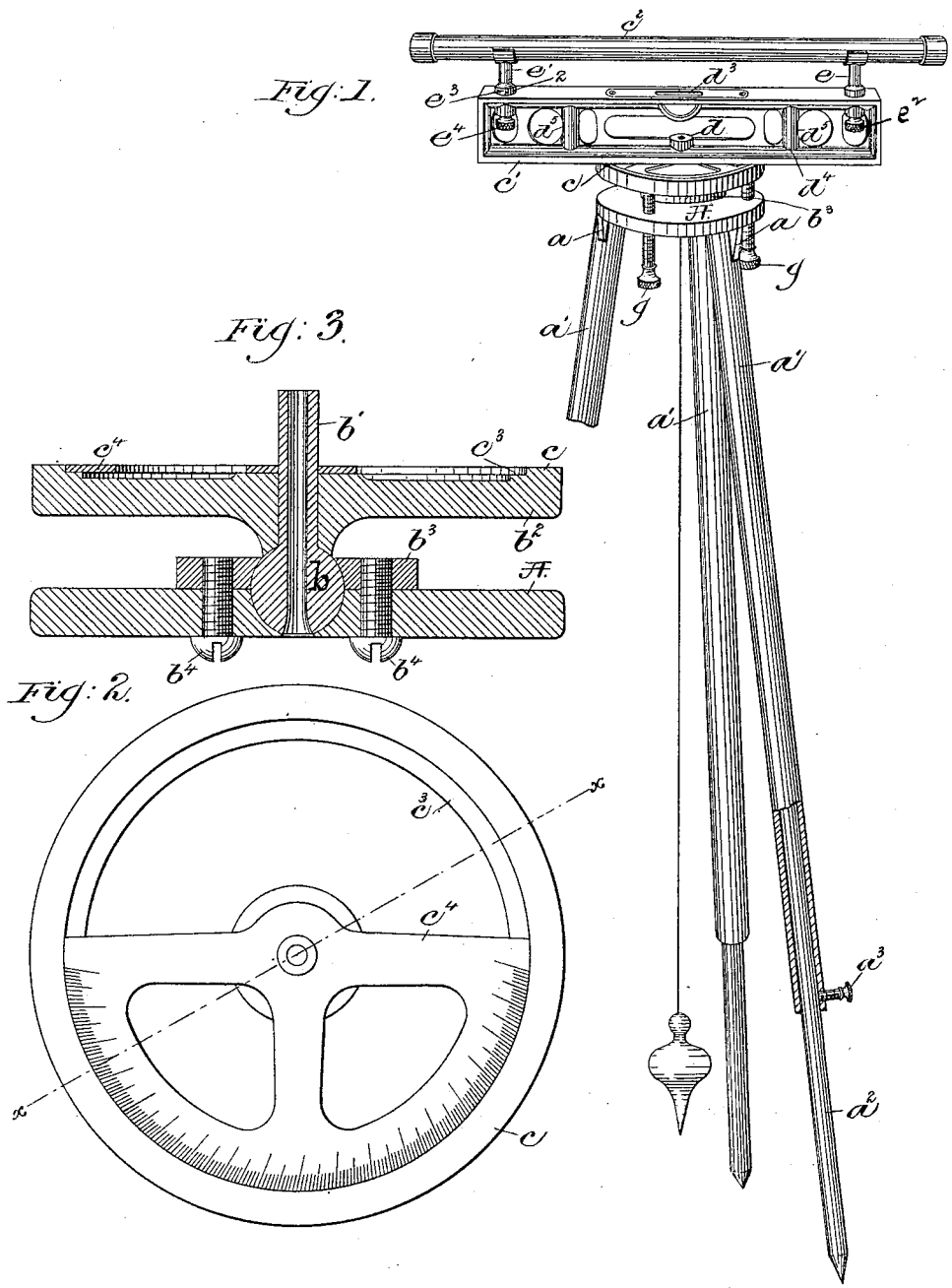

CHARLES F. RICHARDSON, OF ATHOL, MASSACHUSETTS.

SURVEYOR'S TRANSIT.

SPECIFICATION forming part of Letters Patent No. 368,308, dated August 16, 1887.

Application filed February 11, 1887. Serial No. 227,279. (No model.)

*To all whom it may concern:*

Be it known that I, CHARLES F. RICHARDSON, of Athol, county of Worcester, and State of Massachusetts, have invented an Improvement in Surveyors' Transits, of which the following description, in connection with the accompanying drawings, is a specification, like letters on the drawings representing like parts.

My invention relates to theodolites or surveyors' transits, and has for its object to simplify the construction of the same, whereby the said instrument may be easily and quickly worked with accuracy.

The particular features in which my invention consists will be pointed out in the claims at the end of this specification.

Figure 1, in elevation and section, shows a sufficient part of my improved transit to enable my invention to be understood; Fig. 2, a top view of Fig. 1, with the telescope and its stand removed to more clearly show the divided arc or protractor, and Fig. 3 a section of Fig. 2 on line $x$ $x$.

The tripod to support the instrument is composed of a base-plate, A, having lugs $a$, to which are pivoted hollow rods $a'$, forming legs for the tripod. Each hollow rod $a'$ receives within it a rod, $a^2$, made adjustable therein by set-screw $a^3$, to enable the legs of the tripod to be made longer or shorter, as desired.

The base-plate A is countersunk near its center to receive a ball, $b$, on the end of a pintle, $b'$, extended through a plate, $b^2$, the said pintle being also extended through a disk, $b^3$, located below the plate $b^2$ and adapted to be secured to the plate A by screws $b^4$, the disk $b^3$ being countersunk to form part of the bearing for the ball $b$, thus enabling the plate $b^2$ to be turned, as on a universal point. The plate $b^2$ on its upper face is provided with a flange, $c$, upon which rests the stand $c'$, supporting the telescope $c^2$, and the said plate is also provided, as shown, with an inner flange, $c^3$, upon which rests the outer part or circumference of a divided arc, shown as a protractor, $c^4$, fitted upon the pintle $b'$, the said protractor being easily turned about the said pintle for a purpose, as will be hereinafter described. The stand $c'$ is provided, as herein shown, with a hub, $d$, adapted to be fitted upon the pintle $b'$, the said stand being free to be moved about the said pintle as on a pivot. The stand $c'$ is preferably cast to leave on its upper face a chamber for the reception of a spirit-level, $d^2$, and the said stand has on each side of the said chamber, as shown, a hollow post, $d^4$, for the reception of a spirit-level, $d^5$.

The telescope $c^2$, as herein shown, has two hollow posts, $e$ $e'$, the post $e$ resting directly upon the upper face of the stand $c'$, being secured thereto by the screw $e^2$. The post $e'$ rests upon a sleeve, $e^3$, supported by the upper face of the stand $c'$, the post $e'$ receiving within it a screw, $e^4$, extended through the sleeve, and by which the said sleeve and post are secured to the stand $c'$.

Very slight vertical adjustments of the telescope $c^2$ may be made by rotating the sleeve $e^3$ by means of a small rod inserted in holes 2 in the said sleeve.

In the operation of my improved instrument it is first leveled by means of the screws $g$, which are extended through the base-plate A, and upon which rests the plate $b^2$. One of the objects the distance between which it is desired to measure is then sighted and the protractor is turned until the zero registers with the side of the stand $c'$. The stand is turned on its pivot until the second object is sighted, and when sighted the angle through which the telescope has been turned may be read directly from the protractor without deductions. It will thus be seen that the plate $b^2$ remains stationary and is not moved after the instrument is once leveled, as is the case in transits as heretofore constructed and known to me.

My improved transit is very simple in construction and requires very little time to adjust it, and when once adjusted its liability to become out of level is very small. Consequently one may work with more rapidity than with the old style of transits.

I claim—

1. In a surveyor's transit, a tripod, a plate, $b^2$, supported thereby, a telescope and stand therefor pivotally supported upon the said plate, combined with an independent divided arc supported by the said plate and movable independent thereof, as and for the purpose set forth.

2. In a surveyor's transit, a tripod provided with adjustable legs, a plate, $b^2$, supported thereby, a telescope and stand therefor pivotally supported upon the said plate, combined with an independent divided arc supported by the said plate and movable independent thereof, as and for the purpose specified.

3. In a surveyor's transit, a tripod having its base countersunk, the plate $b^2$, the pintle $b'$, provided with the ball $b$, fitted into the countersink of the said base, the disk $b^3$, fitted upon the pintle below the plate $b^2$ and adapted to be secured to the base of the tripod, combined with the divided arc $c^4$, supported upon the plate $b^2$, and with the stand $c'$ and telescope $c^2$, supported thereby, substantially as described.

In testimony whereof I have signed my name to this specification in the presence of two subscribing witnesses.

CHARLES F. RICHARDSON.

Witnesses:
FRANK E. DEXTER,
FRED R. RICHARDSON.